(12) United States Patent
Munevar et al.

(10) Patent No.: US 10,654,162 B2
(45) Date of Patent: May 19, 2020

(54) THERMAL MANAGEMENT SYSTEM

(71) Applicant: Rolls-Royce North American Technologies Inc., Indianapolis, IN (US)

(72) Inventors: Erik A. Munevar, Indianapolis, IN (US); Eric Schneider, Carmel, IN (US); Eric S. Donovan, Fishers, IN (US); Keith D. Noderer, Carmel, IN (US); Russell E. White, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 168 days.

(21) Appl. No.: 15/629,033

(22) Filed: Jun. 21, 2017

(65) Prior Publication Data

US 2018/0370013 A1 Dec. 27, 2018

(51) Int. Cl.
*H01M 10/613* (2014.01)
*B25F 5/00* (2006.01)
*H01M 10/663* (2014.01)
*H01M 10/659* (2014.01)
*H01M 2/34* (2006.01)
*H02J 7/00* (2006.01)
*H01M 10/667* (2014.01)

(52) U.S. Cl.
CPC .............. *B25F 5/008* (2013.01); *H01M 2/348* (2013.01); *H01M 10/613* (2015.04); *H01M 10/659* (2015.04); *H01M 10/663* (2015.04); *H01M 10/667* (2015.04); *H02J 7/007* (2013.01)

(58) Field of Classification Search
CPC ... B25F 5/008; H01M 10/613; H01M 10/659; H01M 10/663; H01M 10/667; H01M 2/348; H02J 7/007
See application file for complete search history.

(56) References Cited

U.S. PATENT DOCUMENTS

| | | | |
|---|---|---|---|
| 6,105,659 | A | 8/2000 | Pocol et al. |
| 6,845,110 | B2 | 1/2005 | Gibson |
| 7,058,100 | B2 | 6/2006 | Vetrovec et al. |
| 7,140,330 | B2 | 11/2006 | Rogers et al. |

(Continued)

FOREIGN PATENT DOCUMENTS

| | | |
|---|---|---|
| WO | WO 2015/081196 A1 | 6/2015 |
| WO | WO 2015/042505 A1 | 3/2017 |
| WO | WO 2017/042505 A1 | 3/2017 |

*Primary Examiner* — Stewart A Fraser
*Assistant Examiner* — Victoria H Lynch
(74) *Attorney, Agent, or Firm* — Brinks Gilson & Lione

(57) ABSTRACT

Systems and methods for thermal management are provided. Thermal management components may include an electrical source and a cooling source. The electrical source may supply electricity to an electrical apparatus. In addition, the thermal management components store thermal energy. A controller may cause the electrical apparatus to be cooled by the cooling source and delay or suspend cooling the electrical source with the cooling source while a state of charge of the electrical source is greater than a predefined value for the electrical source. The state of charge of the electrical source may include a measurement of cooling capacity available by the electrical source.

16 Claims, 6 Drawing Sheets

(56) References Cited

U.S. PATENT DOCUMENTS

2008/0246488 A1* 10/2008 Bosse .............. G01R 19/16542
324/426
2013/0158750 A1    6/2013 Bosson et al.
2013/0178992 A1    7/2013 De Graeve
2018/0319243 A1* 11/2018 Blatchley ............... B60H 1/004

* cited by examiner

THERMAL MANAGEMENT SYSTEM

TECHNICAL FIELD

This disclosure relates to thermal management and, in particular, to thermal management of transient thermal loads.

BACKGROUND

Thermal management systems may be designed to handle peak constant thermal loads without regard to any transient loads or the thermal mass of components in the thermal management system. The components of the thermal management system may be oversized or inefficiently controlled. Present approaches to thermal management may suffer from a variety of drawbacks, limitations, and disadvantages. There is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a system for managing a thermal load may be provided. The system may include a thermal management system. The thermal management system may include thermal management components. The thermal management components may include an electrical source configured to store thermal energy and supply electricity to an electrical apparatus. The thermal management components may additionally include a cooling source configured to cool the electrical apparatus and the electrical source. The system may additionally include a controller configured to cause electrical apparatus to be cooled with the cooling source. The controller may cause a delay or suspension of cooling of the electrical source with the cooling source while a state of charge of the electrical source is greater than a predetermined charged threshold of the electrical source. The state of charge of the electrical source may include a measure of cooling capacity available from the electrical source.

One interesting feature of the systems and methods described below may be that a thermal management system may utilize a thermal capacitance of an electrical source, for example a battery, to manage a thermal load. In some examples, the electrical source may provide a large thermal capacitance. The thermal management system may utilize the thermal capacitance of the electrical source to optimize the cooling output, efficiency, design, size and/or other aspects of the thermal management system.

Alternatively, or in addition, an interesting feature of the systems and methods described below may be that the electrical source may be arranged with other thermal management components to improve management of transient thermal loads, such as pulse loads. For example, the electrical source may be arranged with other thermal management components to dampen known and/or unknown transient thermal loads. Additional interesting features of the system will be described or made apparent in the descriptions, examples, and illustrations disclosed herein.

Figure 1:
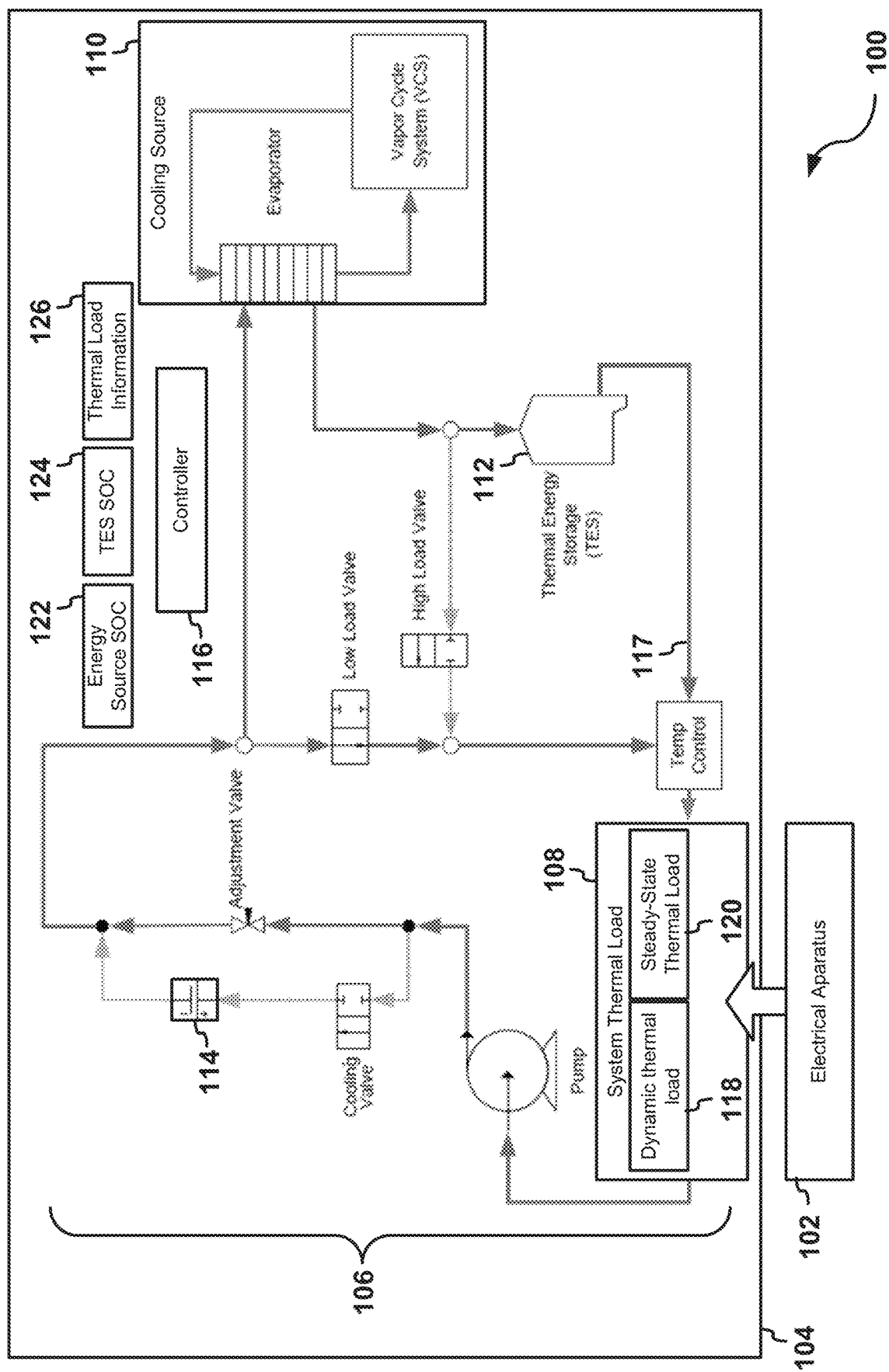
FIG. 1 illustrates an example of a system for managing a thermal load.

FIG. 1 illustrates an example of a system 100 for managing a thermal load. The system 100 may include an electrical apparatus 102 and a thermal management system 104. The thermal management system 104 may include thermal management components 106 to manage a system thermal load 108 at least partially created by the electrical apparatus 102. The thermal management components 106 may include a cooling source 110, a cooling reservoir 112, and/or an electrical source 114. In some examples, the electrical source 114 may at least partially power the electrical apparatus 102. The electrical source 114 may also create and/or contribute to the system thermal load 108.

One or more of the thermal management components 106 may provide and/or distribute cooling to manage the system thermal load 108. For example, the cooling source 110 may provide cooling to the electrical apparatus 102 and/or electrical source 114. The cooling reservoir 112 may supplement cooling provided by the cooling source 110. For example, the electrical apparatus 102 and/or the electrical source 114 may receive cooling from the cooling reservoir 112. In general, the thermal management components 106 may provide cooling by absorbing and dissipating heat generated by the system thermal load 108, and/or the thermal management components 106.

In some examples, the cooling source 110 may cool a cooling fluid 117. The electrical apparatus 102 and/or electrical source 114 may receive cooling fluid cooled by the cooling source 110. In addition, the cooling reservoir 112 may receive and/or store the cooling fluid 117 cooled by the cooling source 110. The electrical apparatus 102 may receive the cooling fluid 117 from the cooling reservoir 112. Alternatively or in addition, the electrical source 114 may receive the cooling fluid 117 from the cooling reservoir 112.

The thermal management system 104 may include a controller 116. The controller 116 may cause one or more of the thermal management components 106 to manage the system thermal load 108. For example, the controller 116 may cause one or more thermal management components to distribute the cooling fluid 117 amongst the thermal management components, the electrical apparatus 102, and/or any other electrical or mechanical device that contributes to the system thermal load 108. In some examples, the controller 116 may utilize the thermal capacitance of the electrical source 114 to optimize cooling of the system thermal load 108. For example, the controller 116 may cause the thermal management components 106 to cool the system thermal load 108. Alternatively or in addition, the controller 116 may cause the thermal management components 106 to suspend and/or resume cooling the electrical source 114. For example, the controller 116 may delay cooling the electrical source 114 in response to various conditions, inputs, and/or criteria that are evaluated by the controller 116.

The system thermal load 108 may refer to an amount of thermal energy managed by the thermal management system 104. For example, the system thermal load 108 may include an amount of thermal energy that is produced by one or more electrical and/or mechanical devices. The electrical apparatus 102 may create and/or contribute to at least a portion of the system thermal load 108.

The system thermal load 108 may include a dynamic thermal load 118 and/or a steady-state thermal load 120. The dynamic thermal load 118 may include a transient thermal load, such as, for example, a pulse load. For example, the dynamic thermal load 118 may be a portion of the system thermal load 108 that varies with respect to other portions of the system thermal load 108, for example the state-state thermal load. The dynamic thermal load 118 may regularly increase and decreases over time. For example, the dynamic thermal load 118 may be created in response to an increase power provided to the electrical apparatus 102, and or any other electrical and/or mechanical component of the system 100. In some examples, the dynamic thermal load 118 may be created by electrical apparatus 102. For example, the electrical apparatus 102 may receive electric power from the electrical source 114. The electrical apparatus 102 may contribute to the dynamic thermal load 118 in response to receiving electric power from the electrical source 114. As the amount of electric power provided to the electrical apparatus 102 varies, at least a portion of the dynamic thermal load 118 created by the electrical apparatus 102 may vary.

The steady-state thermal load 120 may include a thermal load that remains steady over time, such as, for example, a hotel load. The steady-state thermal load 120 may include electrical and/or mechanical devices that generate a consistent thermal load during operation. In some examples, the steady-state thermal load 120 may be a thermal load contributed by the electrical apparatus 102 in response to power supplied to the electrical apparatus 102. In addition, the dynamic thermal load 118 may be a thermal load contributed by electrical apparatus 102 in response to an increase in the power supplied the electrical apparatus 102.

The electrical apparatus 102, or any portion thereof, may create and/or contribute to the dynamic thermal load 118. For example, the electrical apparatus 102 may include a light emitting diode (LED) of a directed energy weapon. The cooling demand of the LED may vary depending on an operational state of the directed energy weapon. For example, as the LED emits thermal energy, a thermal demand of the directed energy weapon may dramatically increase in a short amount of time. The operation of the LED may create at least a portion of the dynamic thermal load 118. In other examples, the electrical apparatus 102, or any portion thereof, may create and/or contribute to the steady-state thermal load 120. For example, the electrical apparatus 102 may include targeting computers associated with the directed energy weapon that create at least a portion the steady-state thermal load 120. In some examples, the electrical apparatus 102 may create both the dynamic thermal load 118 and the steady-state thermal load 120.

The thermal management components 106 may include any component that manages a thermal load. The thermal management components 106 may include one or more components that distributes thermal energy, provides cooling, provides heating, dissipates heat, controls a rate of cooling, and/or is otherwise used to cause heating and/or cooling of one or more electrical and/or mechanical devices. For example, the thermal management components 106 may include the cooling source 110, the cooling reservoir 112, and/or the electrical source 114. In some examples, the thermal management components 106 may redistribute thermal energy with the cooling fluid 117. The cooling fluid 117 may flow from the thermal management components 106 to one or more apparatuses, such as the electrical apparatus 102 that contributes to the system thermal load 108. In addition, the thermal management components 106 may include valves, pumps, and other actuators, which adjust the rate of flow and/or the direction of flow of the cooling fluid 117.

The cooling source 110 may include an electrically or mechanically powered apparatus that dissipates thermal energy. The cooling source 110 may dissipate heat from the system thermal load 108. For example, the cooling source 110 may receive the cooling fluid 117 that was applied the electrical apparatus 102. In addition, the cooling source 110 may receive the cooling fluid 117 that was applied to any of the thermal management components 106, including, for example, the electrical source 114. The cooling source 110 may include an evaporator, a condenser, one or more pumps, valves and/or other components configured to transfer thermal energy and/or dissipate heat. In some examples, the cooling source 110 may provide vapor cooling. For example, the cooling source 110 may include a vapor-compression refrigeration system. The cooling source 110 may circulate a refrigerant through a condenser and the evaporator. As the cooling fluid 117 is applied to the evaporator, heat may transfer to the evaporator. The refrigerant may cool the evaporator.

The thermal management components 106 may include one or more thermal energy storage. A thermal energy storage may include any apparatus that absorbs thermal power and/or stores thermal energy. In some examples, the thermal energy storage may include a tank for storing a gaseous or non-gaseous fluid, such as the cooling fluid 117. The gaseous or non-gaseous fluid may have been previously cooled by the cooling source 110. In other examples, the thermal energy storage may include a structure and/or liquid that absorbs thermal power. The thermal energy storage may be cooled to increase the amount of heat that the thermal energy storage may absorb. In some examples, the thermal energy storage may include the cooling source 110, the cooling reservoir 112, the electrical source 114.

The cooling reservoir 112 may include an apparatus that stores cooling capacity and/or absorbs thermal power. For example, for example, the cooling reservoir 112 may store the cooling fluid 117, or any other example of gaseous or non-gaseous fluid. In some examples, the cooling reservoir 112 may include a reservoir that stores the cooling fluid 117. For example, the cooling reservoir 112 may include a tank. The cooling reservoir 112 may store cooling fluid 117 that was cooled by the cooling source 110. In some examples, the cooling reservoir 112 may supplement cooling provided by the cooling source 110. For example, cooling fluid 117 from the cooling reservoir 112 may be applied to the electrical apparatus 102 and/or the electrical source 114.

The controller 116 may cause one or more of the thermal management components 106 to direct the cooling fluid 117 to the system thermal load 108 in response to detection of the dynamic thermal load 118. For example, when the thermal demand of the system thermal load 108, or any portion thereof, exceeds the thermal capacity of the cooling source 110 and/or the thermal management system 104, the cooling reservoir 112 may provide additional thermal capacity. In addition, the cooling source 110 may recharge the cooling reservoir 112. For example, the cooling reservoir 112 may store the cooling fluid 117 that was cooled by the cooling source 110.

The electrical source 114 may include any device that supplies electrical power. The electrical source 114 may partially power or fully power the electrical apparatus 102 and/or other components of the system 100. In some examples, the electrical source 114 may include a battery. For example, the electrical source 114 may include a battery that uses metal and metal oxide electrodes. Alternatively or in addition, the electrical source 114 may include a lead battery, a lead acid battery, or any other kind of battery that uses water as an electrolyte. Alternatively or in addition, the electrical source 114 may include any source of electricity that also includes thermal capacity to at least partially retain heat emitted by the electrical load. For example, the electrical source 114 may include heat sinks, conductors, electrolytes, electrodes and other components that provide the electrical source 114 with thermal capacity.

In some examples, the amount of thermal capacity required by the electrical source 114 may be based on an electrical load powered by the electrical source 114. For example, the thermal capacity required by the electrical source may dependent on the size of the electrical load and the duration that the electrical load applied to the electrical source 114. In some examples, the electrical source 114 may include a battery and the thermal capacitance of the battery may be expressed as:

Minimum Thermal Capacity=$(B_L)(1-B_E)(T)$ $B_L$ may represent the battery load and includes the amount of power being drawn from the battery. $B_E$ may represent the battery efficiency and include the charge efficiency of the battery. T may represent an amount of time that power is drawn from the battery.

The electrical source 114 may include additional components that transfer heat to or away from other components. For example, the electrical source 114 may be in fluid communication with the electrical apparatus 102, the cooling reservoir 112, the cooling source 110 and any other component of the thermal management system 104. In addition, the electrical source may include a valve, a connector, and other components that receive and/or store the cooling fluid 117.

In some examples, the electrical apparatus 102 may generate the system thermal load 108 in response to the electricity received from the electrical source 114. For example, the LED of the directed energy weapon may create the dynamic thermal load 118 in response to the electrical power received from the electrical source 114.

The cooling fluid 117 may be any gaseous or non-gaseous fluid. The cooling fluid 117 may be augmented for improved cooling, flow, and other design considerations. In some examples, the cooling fluid 117 may include a mixture of fluids, for example, the cooling fluid 117 may include a mixture propylene glycol and water (PGW). The cooling fluid 117 may be pressurized in a pump, for example, and transferred between the thermal management components 106, the electrical apparatus 102, and/or any other electrical and/or mechanical device. The cooling fluid 117 may absorb heat from the electrical apparatus 102, the electrical source 114, and/or any component where the cooling fluid 117 is applied. Alternatively or in addition, components that receive the cooling fluid 117 may absorb heat from the cooling fluid 117.

In some examples, the controller 116 may control the thermal management components 106 based on various conditions, inputs, and/or criteria that are evaluated by the controller 116. For example, the controller 116 may receive a state of charge 122 of the electrical source 114, a state of charge 124 of the cooling reservoir 112, thermal load information 126, and other information related to the thermal management system 104, the system thermal load 108, and/or the electrical apparatus 102.

In general, state of charge of a thermal energy storage may include a measure of cooling available by the thermal energy storage. For example, the state of charge of the thermal energy storage may include a measure of a capacity of the thermal energy storage to absorb the thermal power. For example, the electrical source 114 may produce electrical power, which reduces the state of charge 122 of the electrical source 114. In addition, the electrical source 114 may absorb thermal power (heat) also reducing the state of charge 122 of the electrical source 114. When the state of charge for the thermal energy storage is 0%, the thermal energy storage may no longer have capacity to absorb additional thermal energy without causing some undesired impact to the cooling system, such as raising the temperature of the coolant in the cooling system. At 100% state of charge, the thermal energy storage may be been charged to a level such that the thermal energy storage has a maximum capacity to absorb thermal power.

In some examples, the thermal energy storage may include a fixed amount of cooling fluid 117, for example a mixture of propylene glycol and water (PGW), stored in a tank. The capacity of the thermal energy storage to absorb thermal power may be calculated using the equation:

$Qt = V * C_p * \rho * (T_{set} - T_{tank})$ where Q includes heat addition to the thermal energy storage over time t. For example, Qt may be expressed as Kilowatt seconds or any other example of thermal energy. V may include the volume of the thermal energy storage. $C_p$ may include a specific heat of the cooling fluid, $\rho$ may include the density of the cooling fluid, $T_{set}$ may include a maximum allowed temperature of the cooling fluid, in the tank such that the system may still provide cooling, and $T_{tank}$ may include a temperature of the tank.

In some examples, $C_p$, $\rho$, V and/or $T_{set}$ may be considered constants. For example, $C_p$, $\rho$, V, and/or $T_{set}$ may be defined during the design of the thermal management storage. Assuming that the initial condition of the thermal energy storage is fully charged, for example the cooling fluid in the tank has been chilled to its lowest temperature, the state of charge can be calculated using any of the following equations:

$$SOC = \left[ \frac{Q * t}{(Q * t)_{initial}} \right] * 100\%$$

$$SOC = \left[ \frac{V * C_p * \rho * (T_{set} - T_{tank})}{V * C_p * \rho * (T_{set} - (T_{tank})_{initial})} \right] * 100\%$$

$$SOC = \left[ \frac{T_{set} - T_{tank}}{T_{set} - (T_{tank})_{initial}} \right] * 100\%$$

When a temperature of the thermal energy storage rises so that the temperature of the thermal energy storage is equal to the set temperature the state of charge may be 0%. In addition, when a temperature of the thermal energy storage is equal to the initial tank temperature the state of charge may be 100%.

In some examples, the state of charge 122 of the electrical source 114 may include a calculated value based on one or more direct measurements of the electrical source 114. The one or more direct measurements of the electrical source 114 may include, for example, a temperature of the electrical source 114, a rate of electrical charge of the electrical source 114, and/or a rate of electrical discharge of the electrical source 114. Alternatively, or in addition, the state of charge 122 of the electrical source 114 may include one or more indirect measurements related to the electrical source 114 including, for example, an ambient temperature. The thermal management controller may receive the direct measurements and/or indirect measurements to calculate the state of charge 122 of the electrical source 114.

The controller 116 may additionally or alternatively control the thermal management components 106 based on the thermal load information 126. The thermal load information 126 may include any information related to the system thermal load 108 and/or the one or more apparatus that created the system thermal load 108. The thermal load information 126 may include, for example a temperature measurement of the system thermal load 108 or any portion thereof. Alternatively or in addition, the thermal load information 126 may include known thermal load values. For example, the thermal load information 126 may include a predetermined value indicative the dynamic thermal load 118 that is created by the electrical apparatus 102. In some examples, the thermal load information 126 may include information corresponding to an anticipated thermal load. For example, the thermal load information 126 may include information corresponding to an expected dynamic thermal load to be generated at a future time. For example, the thermal load information 126 may include the expected thermal load to be created by firing a directed energy weapon.

In some examples, the controller 116 may control how the cooling fluid 117 is routed through the thermal management components 106. For example, the controller 116 may control one or more valves to direct the cooling fluid 117 to the cooling reservoir 112 and/or the cooling source 110. In addition, the controller 116 may control the one or more valves to cause the cooling fluid 117 to bypass the cooling reservoir 112 and/or the cooling source 110. For one example, the controller 116 may control a low-load valve to direct the cooling fluid 117 to bypass the cooling source 110. Alternatively or in addition, the controller 116 may control a high load valve to direct cooling fluid 117 to the electrical apparatus 102. In other examples, the controller 116 may control any number of valves, pumps, actuators and/or any other type of device to control the cooling fluid 117 with the thermal management components 106.

The controller 116 may control cooling of the electrical source 114. For example, the controller 116 may cause the thermal management components 106 to apply cooling to the electrical source 114. In some examples, the controller 116 may cause the thermal management components 106 to apply the cooling fluid 117 to the electrical source 114. Alternatively or in addition, the controller 116 may cause the thermal management components 106 to suspend and/or delay cooling of the electrical source 114. For example, the controller 116 may cause the thermal management components 106 to restrict application of the cooling fluid 117 to the electrical source 114. For example, the controller 116 may close a valve configured to the cooling fluid 117 to the electrical source 114. Alternatively or in addition, the controller 116 may limit a flow rate of cooling fluid 117 applied to the electrical source 114.

Alternatively or in addition, the controller 116 may evaluate the state of charge 122 of the electrical source 114 and the state of charge 124 of the cooling reservoir 112 to manage the system thermal load 108. For example, the controller 116 may configure one or more of the thermal management components 106 provide and/or suspend cooling provided by the cooling source 110, the electrical source 114, and/or the cooling reservoir 112 based on an evaluation of the state of charge 122 of the electrical source 114 and/or a state of charge 124 of the cooling reservoir 112, and/or the thermal load information 126.

The controller 116 may compare the state of charge 122 of the electrical source with a predetermined threshold value of the electrical source 114. The predetermined threshold value of the electrical source 114 may include a value stored in a memory or otherwise provided to the controller 116. In some examples, the predetermined threshold value may be configured prior to operation of the controller 116. Alternatively or in addition, the predetermined threshold hold value may be communicated to the controller 116. The predetermined threshold value of the electrical source 114 may represent a predetermined state of charge. The controller 116 may compare the state of charge 122 of the electrical source 114 to one or more predetermined charge thresholds of the electrical source 114 to control the thermal management system 104 and/or any of the thermal management components 106.

An example of the predetermined threshold value may include a predetermined charge threshold. The predetermined charge threshold may include a value that indicates when cooling should be applied to the electrical source 114 and when cooling may be delayed. For example, the controller 116 may delay cooling the electrical source 114 with the cooling source 110 in response to the state of charge of the electrical source 114 being greater than the predetermined charge threshold of the electrical source 114. Alternatively or in addition, the controller 116 may cause one or more of the thermal management components 106 to cool the electrical source 114 in response to the state of charge 122 of the electrical source 114 being less than the predetermined charged threshold of the electrical source 114.

In some examples, the predetermined threshold value may include a predetermined upper charge threshold of the electrical source 114. The controller 116 may delay cooling the electrical source 114 with the cooling source 110 in response to the state of charge 122 of the electrical source 114 being greater than the predetermined upper charge threshold of the electrical source 114. Alternatively or in addition, the controller 116 may cause the electrical source 114 to be cooled by the cooling source 110 in response to the state of charge 122 of the electrical source 114 being less than a lower charge threshold of the electrical source 114.

Alternatively or in addition, an example of the predetermined threshold value of the electrical source 114 may include a predetermined completion threshold of the electrical source 114. The predetermined completion threshold of the electrical source 114 may include an upper threshold value representative of the cooling capacity of the electrical source 114 being fully or near-fully charged. For example, the predetermined completion threshold may include any value greater than 90% state of charge.

Alternatively or in addition, the controller 116 may compare the state of charge 124 of the cooling reservoir 112 with a predetermined threshold value of the cooling reservoir 112. The predetermined threshold value of the cooling reservoir 112 may include an upper threshold value stored in a memory or otherwise provided to the controller 116. In some examples, the predetermined threshold value may be configured prior to operation of the controller 116. Alternatively or in addition, the predetermined threshold hold value may be communicated to the controller 116. The predetermined threshold value of the cooling reservoir 112 may represent a predetermined state of charge. The controller 116 may compare the state of charge 124 of the cooling reservoir 112 to one or more predetermined charge thresholds of the cooling reservoir 112 to control the thermal management system 104 and/or any of the thermal management components 106.

Alternatively or in addition, the controller 116 may determine that the state of charge 124 of the cooling reservoir 112 is less than a charge threshold of the thermal energy storage. In response to determining that the state of charge 124 of the cooling reservoir 112 is less than the charge threshold of the cooling reservoir 112, the controller 116 may send a request to the electrical apparatus 102 and/or any other device to decrease a thermal demand of the electrical apparatus 102. The request may include any signal that may result in the electrical apparatus 102 decreasing the system thermal load.

In an additional example, the predetermined charge threshold of the cooling reservoir 112 may include a predetermined reserve threshold. The predetermined reserve threshold may represent a threshold for when the cooling reservoir 112 has enough cooling capacity to provide cooling to the electrical source 114. For example, the predetermined reserve threshold may relate to cooling capacity of the cooling fluid reservoir that may be provided to the electrical source. For example, the controller 116 may delay cooling the electrical source 114 when the state of charge 124 of the cooling reservoir 112 is greater than predetermined reserve threshold. Alternatively or in addition, the controller 116 may cool the electrical source 114 when the state of charge 124 of the cooling reservoir 112 is less than predetermined reserve threshold.

Alternatively or in addition, an example of the predetermined threshold value of the cooling reservoir 112 may include a predetermined completion threshold of the cooling reservoir 112. The predetermined completion threshold of the electrical source 114 may include a value representative of the cooling capacity of the electrical source 114 being fully or near-fully charged. For example, the predetermined completion threshold of the cooling reservoir 112 may include any value greater than 90% state of charge.

In some examples, controller 116 may evaluate a combination of one or more predetermined charge thresholds of the electrical source 114 with one or more predetermined charge thresholds of the cooling reservoir 112 to determine how to distribute cooling. For example, the controller 116 may delay cooling of the electrical source 114 in response to the state of charge 122 of the electrical source 114 being within a predetermined charge range and the state of charge 124 of the cooling reservoir 112 being less than the predetermined reserve threshold of the cooling reservoir 112. Alternatively or in addition, the controller 116 may cool the electrical source in response to the state of charge 122 of the electrical source 114 being within the predetermined charge range and the state of charge 124 of the cooling reservoir 112 being greater than the predetermined reserve threshold of the cooling reservoir 112. In some examples, the predetermined charge range of the electrical source 114 may be defined by the predetermined upper charge threshold of the electrical source and the predetermined lower charge threshold of the electrical source 114.

Alternatively or in addition, the controller 116 may suspend operation of the cooling source 110 when the electrical source 114 and the thermal energy storage are fully charged or near-fully charged. For example, the controller 116 may suspend operation of the cooling source 110 when the state of charge 122 of the electrical source 114 is at least the predetermined completion threshold for the electrical source 114. Alternatively or in addition, the controller 116 may suspend operation of the cooling source 110 when the state of charge 124 of the cooling reservoir 112 is at least the predetermined completion threshold for the cooling reservoir 112. To suspend operation of the cooling source 110 the controller 116 may control the operation of one or more components of the cooling source 110 such as, for example, pumps, compressors, condensers, evaporators, valves, or any other component of the cooling source 110. Alternatively or in addition, the controller 116 may control the amount of power supplied to the cooling source 110 and/or any component of the cooling source 110.

The thermal management system 104 may include various arrangements of the thermal management components 106. The controller 116 may control the thermal management components 106 to manage the system thermal load based on the various possible arrangements.

Figure 2:
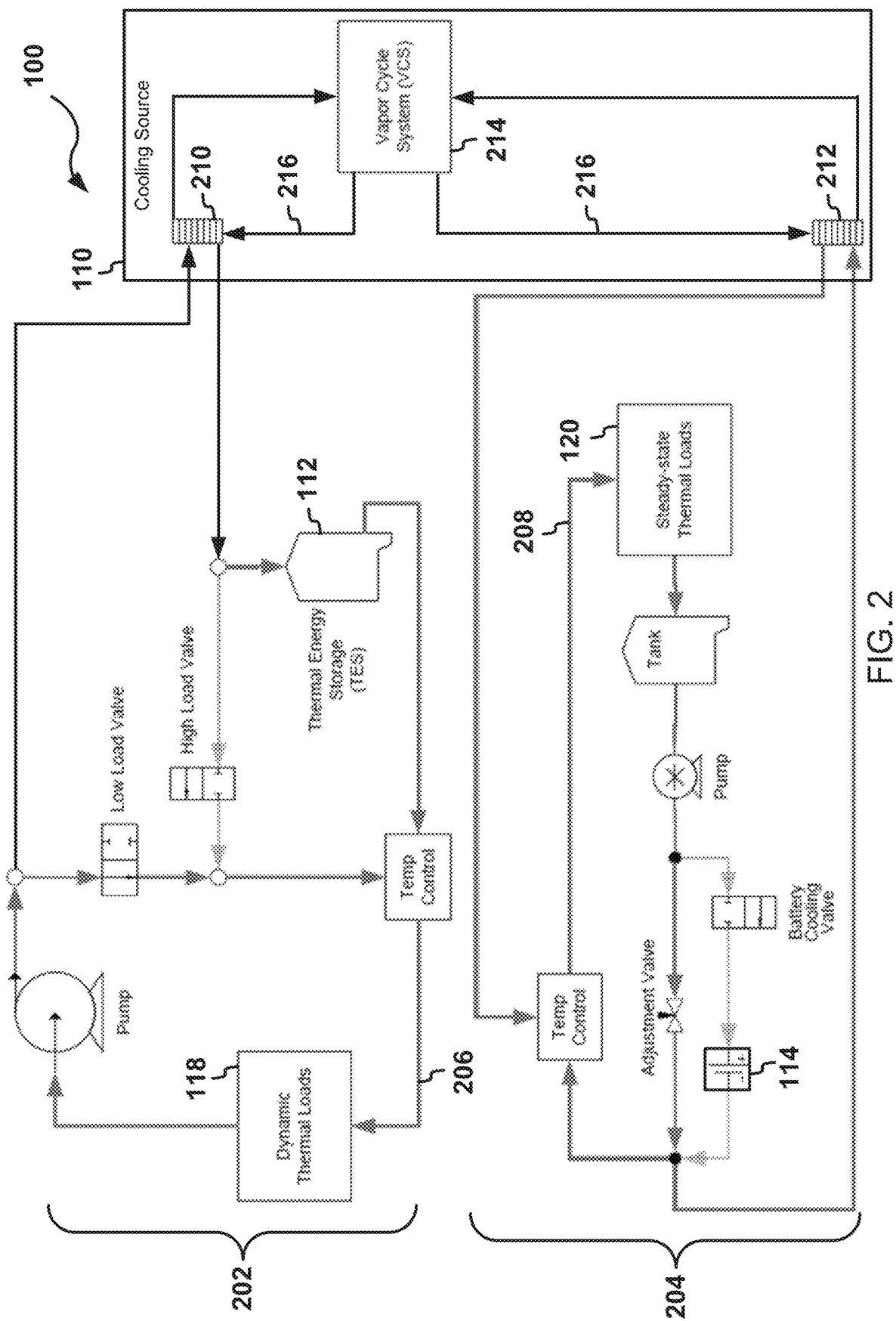
FIG. 2 illustrates a second example of a system for managing a thermal load.

FIG. 2 illustrates a second example of the system 100 for managing a thermal load. The thermal management components 106, or any portion thereof, may be arranged in cooling loops. A first cooling loop 202 may distribute a first cooling fluid 206 to cool the dynamic thermal load 118. The second cooling loop 204 may distribute a second cooling fluid 208 to cool the steady-state thermal load 120. The first cooling loop 202 may be isolated from the second cooling loop 204. The first cooling loop 202 may cool the dynamic thermal load 118 separate and independent of the second cooling loop 204. The second cooling loop 204 may cool the steady-state thermal load 120 separate and independent of the first cooling loop 202. In some examples, the first cooling fluid 206 and the second cooling fluid 208 may include the same type of cooling fluid. Alternatively, the first cooling fluid 206 and the second cooling fluid 208 may not include the same type of cooling fluid.

The cooling source 110 may include a first evaporator 210, a second evaporator 212, and/or a vapor cycle system 214. The vapor cycle system 214 may chill a refrigerant 216 distributed by the vapor cycle system 214 to the first evaporator 210 and the second evaporator 212. The vapor cycle system 214 may provide cooling by vaporizing a refrigerant. The refrigerant 216 may include, for example, a vaporization fluid. The first evaporator 210 may dissipate heat from the first cooling loop 202. The second evaporator 212 may dissipate heat from the second cooling loop 204. In some examples, refrigerant 216 may include a first refrigerant for application to the first evaporator 210 and a second refrigerant for application to the second evaporator 212. The first refrigerant and the second refrigerant may be different types of refrigerant.

In some examples, the first cooling loop 202 may manage the dynamic thermal load 118. For example, the first cooling loop 202 may distribute the first cooling fluid 206 to the cooling source 110 to cool the first cooling fluid 206. The first evaporator 210 may dissipate heat from the first cooling fluid 206. After the first cooling fluid 206 is cooled, the first cooling loop 202 may distribute the first cooling fluid 206 to the dynamic thermal load 118. Alternatively or in addition, the first cooling loop 202 may distribute cooling fluid to the cooling reservoir 112. The cooling reservoir 112 may receive cooling fluid cooled by the cooling source 110. The cooling reservoir 112 may supplement cooling provided by the cooling source 110. For example, the cooling reservoir 112 may provide stored cooling fluid to the dynamic thermal load 118 in response to cooling demands of the dynamic thermal load 118 exceeding the thermal capacitance of the cooling source 110. For example, when the first cooling fluid 206 cooled by the cooling source 110 is not adequately cooling the dynamic thermal load 118, the first cooling loop may supply the dynamic thermal load 118 with the first cooling fluid 206 that that is stored in the cooling reservoir 112 to improve the cooling of the dynamic thermal load 118.

The second cooling loop 204 may manage the steady-state thermal load 120. The second cooling loop 204 may distribute the second cooling fluid 208 to the steady-state thermal load 120 to heat and/or cool the steady-state thermal load 120. For example, the cooling source 110 may cool the second cooling fluid 208. In some examples, the second evaporator 212 may dissipate heat from the second cooling fluid 208. The second cooling loop 204 may distribute the second cooling fluid 208 from the cooling source 110 to the steady-state thermal load 120. In addition, the second cooling loop 204 may distribute the second cooling fluid 208 from the steady-state thermal load 120 to the electrical source 114.

The second cooling loop 204 may delay cooling the electrical source 114. For example, the second cooling loop 204 may stop and/or slow the electrical source 114 from being cooled by the cooling source 110. In some examples, the controller 116 may control a cooling valve to stop and/or modify the flow of the second cooling fluid 208 applied to the electrical source 114. For example the cooling value may stop, decrease, or increase a flow of the second cooling fluid 208 to the electrical source 114.

In the example illustrated in FIG. 2, the steady-state thermal load 120 is prioritized over the electrical source 114. For example, the steady-state thermal load 120 receives the second cooling fluid 208 from the cooling source 110 before the electrical source 114 receives the second cooling fluid 208. In other examples, the second cooling loop 204 may prioritize the electrical source 114 over the steady-state thermal load 120. For example, the electrical source 114 may receive the second cooling fluid 208 before the steady-state thermal load 120.

While the example illustrated in FIG. 2 includes two cooling loops, other examples may include one cooling loop and/or more than two cooling loops. For example, the system 100 may include a cooling loop that manages both the dynamic thermal load 118 and the steady-state thermal load 120. The cooling loop may include any arrangement of any of the thermal management components 106 described herein. For example, the cooling loop may distribute the cooling fluid from the cooling source 110 to the cooling reservoir 112, the battery, the electrical apparatus 102, and/or any other component of the system 100. The controller 116 may control the flow of cooling fluid in the cooling loop. For example the controller 116 may delay cooling the electrical source 114 by limiting and/or stopping application of the cooling fluid cooled by the cooling source 110 and/or supplied by the cooling reservoir 112.

The controller 116 may account for the thermal capacitance of the electrical source 114 to control thermal management of the system thermal load 108. In some examples, the system thermal load 108 may be known and the controller 116 may manage the cooling of the system thermal loads based on the known system thermal load. In other examples, the system thermal load 108 may be unknown and the controller may monitor additional inputs to determine how to control the thermal management components.

Figure 3:
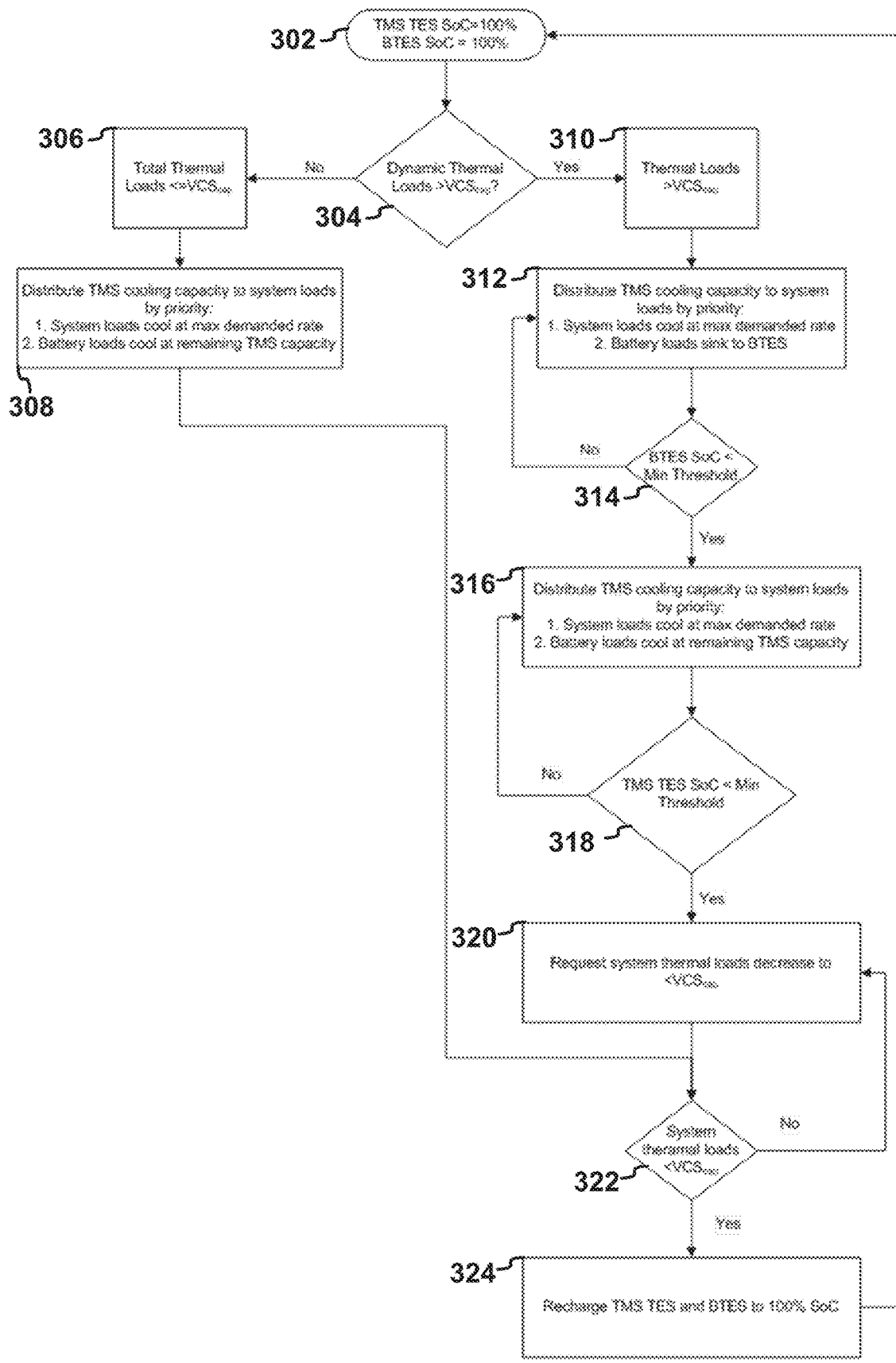
FIG. 3 illustrates an example of a flow diagram for cooling a known thermal load.

FIG. 3 illustrates an example of a flow diagram for cooling a known thermal load. In the example illustrated in FIG. 3, the electrical source 114 may include, as a non-limiting example, a battery and a battery thermal energy storage (BTES). The BTES may include the portions of the electrical source 114 that store and/or absorb thermal energy. The BTES may be cooled to increase the amount of heat that the thermal energy storage may absorb. In addition, the BTES may be a portion of the electrical source 114 that receives, stores, and/or applies cooling fluid to any component of the electrical source.

In addition, the cooling reservoir 112 may include, as a non-limiting example, the thermal management system thermal energy storage (TMS TES). The TMS TES may include a structure configured to store cooling potential for the system 100. For example, the TMS TES may include a tank that receives, stores, and supplies cooling fluid. Alternatively or in addition, the TMS TES may include any other example of thermal energy storage as described herein.

When the flow logic illustrated in FIG. 3 starts, a state of charge of the TMS TES and a state of charge of the BTES may initially be fully charged (302). In other examples, the state of charge 124 of the TMS TES may be greater than or equal to the predetermined completion threshold for the TMS TES. Alternatively or in addition, the state of charge 122 of the BTES may be greater than or equal to the optimum charge threshold for the BTES.

The controller 116 may determine whether the dynamic thermal load 118 is greater than a thermal capacity of the vapor cycle system 214 (304). Alternatively or in addition, the controller 116 may determine whether the electrical apparatus 102 has created, or will create, a transient thermal load. For example, the controller 116 may receive the thermal load information 126 from a sensor, such as a thermocouple, that measures the heat generated by the electrical apparatus 102. The controller 116 may use the thermal load information 126 to determine whether the electrical apparatus 102 has created a dynamic thermal load 118 and/or whether the dynamic thermal load 118 is greater than the thermal capacity of the vapor cycle system 214.

In other examples, thermal load information may include operational attributes of the system thermal load 108. For example, the controller 116 may determine whether the dynamic thermal load 118 is greater than the thermal capacity of the vapor cycle system 214 using operational attributes of the electrical apparatus 102. The operations attributes may include, for example, a predetermined thermal load value associated with the electrical apparatus 102. The controller 116 may compare the predetermined thermal load value with the thermal capacity of the vapor cycle system to determine whether the dynamic thermal load 118 is greater than the thermal capacity of the vapor cycle system 214. In other examples, the predetermined thermal load value may correspond to a future operational state of the electrical apparatus 102. For example, the predetermined thermal load value may correspond to an anticipated thermal load in the future. For example, the predetermined thermal load value may correspond to an anticipated thermal load created by firing of a directed energy weapon. Based on the predetermined load value, the controller 116 may predictively determine whether the dynamic thermal load 118 will be greater than the thermal capacity of the vapor cycle system 214.

When the dynamic thermal load 118 is not greater than the thermal capacity for the vapor cycle system 214 (304, no), the controller 116 may determine that the system thermal load 108 is less than or equal to the thermal capacity for the vapor cycle system 214 (306). For example, the controller 116 may determine that the combination of the steady-state thermal load 120 and the dynamic thermal load 118 do not exceed the thermal capacity of the vapor cycle system 214 and, in response, the controller 116 may cause the thermal management components 106 to cool the system thermal load 108 and the electrical source 114 with the remaining thermal capacity of the thermal management system 104 (308). The thermal capacity of the thermal management system 104 may include the thermal management of the vapor cycle system 214, the thermal capacity of the TMS TES, the thermal capacity of the BTES, and the thermal capacity of other thermal management components 106.

When the controller 116 determines that the dynamic thermal load 118 is, and/or will be, greater than the thermal capacitance of the vapor cycle system 214 (304, yes), the controller 116 may determine that the system thermal load 108 is greater than the thermal capacitance of the vapor cycle system 214 (310). In response to the system thermal load 108 exceeding the thermal capacity of the vapor cycle system 214, the controller 116 may cause the thermal management system 104 to delay cooling the electrical source 114 with the vapor cycle system and/or the TMS TES (312). While cooling of the electrical source 114 is delayed, the vapor cycle system 214 and/or the TMS TES may cool the system thermal load 108 at its maximum demanded rate. In addition, the electrical source 114 may rely on the BTES of the electrical source 114 to remain cool while the vapor cycle system 214 and/or the TMS TES cool the system thermal load 108.

The controller 116 may determine whether the state of charge of the BTES of the electrical source 114 is less than the predetermined lower charge threshold (314). While the state of charge of the BTES is not less than the predetermined lower charge threshold (314, no), the controller 116 may cause one or more of the thermal management components 106 to continue to delay cooling the electrical source 114. When the state of charge of the BTES drops below the predetermined lower charge threshold (314, yes), the controller 116 may cause the thermal management components 106 cool the electrical source 114 and the system thermal load 108 (316).

After the controller 116 causes the thermal management components 106 to cool the electrical source 114, the controller 116 may continue to monitor the TMS TES to ensure that the state of charge 124 of the TMS TES is within limits (316). For example, the controller 116 may determine that the state of charge 124 of the TMS TES is not lower than the predetermined charge threshold of the TMS TES (318, no) and, in response, continue to cool both the electrical source 114 and the system thermal load 108. When the controller 116 determines that the state of charge of the TMS TES falls below the predetermined charge threshold of the TMS TES (318, yes), the controller 116 may generate a request to decrease thermal loading (320).

While the system thermal load 108 is greater than the capacity of the vapor cycle system 214, the controller 116 may continue to request that the system thermal load 108 decrease. Alternatively or in addition, the controller 116 may wait for the system thermal load 108 to decrease. When the system thermal load 108 is less than or equal to the capacity of the vapor cycle system 214 (322, yes), the controller 116 may cause the thermal management components 106 to cool, or continue to cool, both the TMS TES and electrical source 114 until the TMS TES and BTES of the electrical source 114 are fully charged (324). The TMS TES may be fully charged when the state of charge of the TMS TES reaches the predetermined completion threshold of the TMS TES. The BTES of the electrical source 114 may be fully charged when the state of charge of the BTES reaches the predetermined completion threshold of the BTES.

In some examples, the system thermal load 108, or any portion thereof, may be unknown. For example, the steady-state thermal load 120 and/or the dynamic thermal load 118 may be unknown. The controller 116 may monitor inputs and cool the system thermal load 108 based on the inputs.

The logic illustrated in the flow diagrams in FIG. 3 may include additional, different, or fewer operations than illustrated. In some examples, the operation to request that the system thermal loads decrease (320) may be omitted. Alternatively or in addition, logic may include logic to suspend operation of the cooling source 110 or any component of the cooling source 110, for example the vapor cycle system 214. For example, operation of the cooling source 110 may be suspending by decreasing the amount of power supplied to the cooling source and/or any component therein. In some examples, operation of the cooling source 110 may be suspended in response to the state of charge 122 of the electrical source 114 exceeding a predefined optimal charge threshold. For example, operation of the cooling source 110 may be suspending by decreasing the amount of power supplied to the cooling source and/or any component therein. In some examples, operation of the cooling source 110 may be suspended in response to the state of charge 122 of the electrical source 114 exceeding a predefined optimal charge threshold. Alternatively or in addition operation of the cooling source 110 may be suspended in response to the state of charge 124 of the cooling reservoir 112 exceeding a predefined optimal charge threshold.

Figure 4:
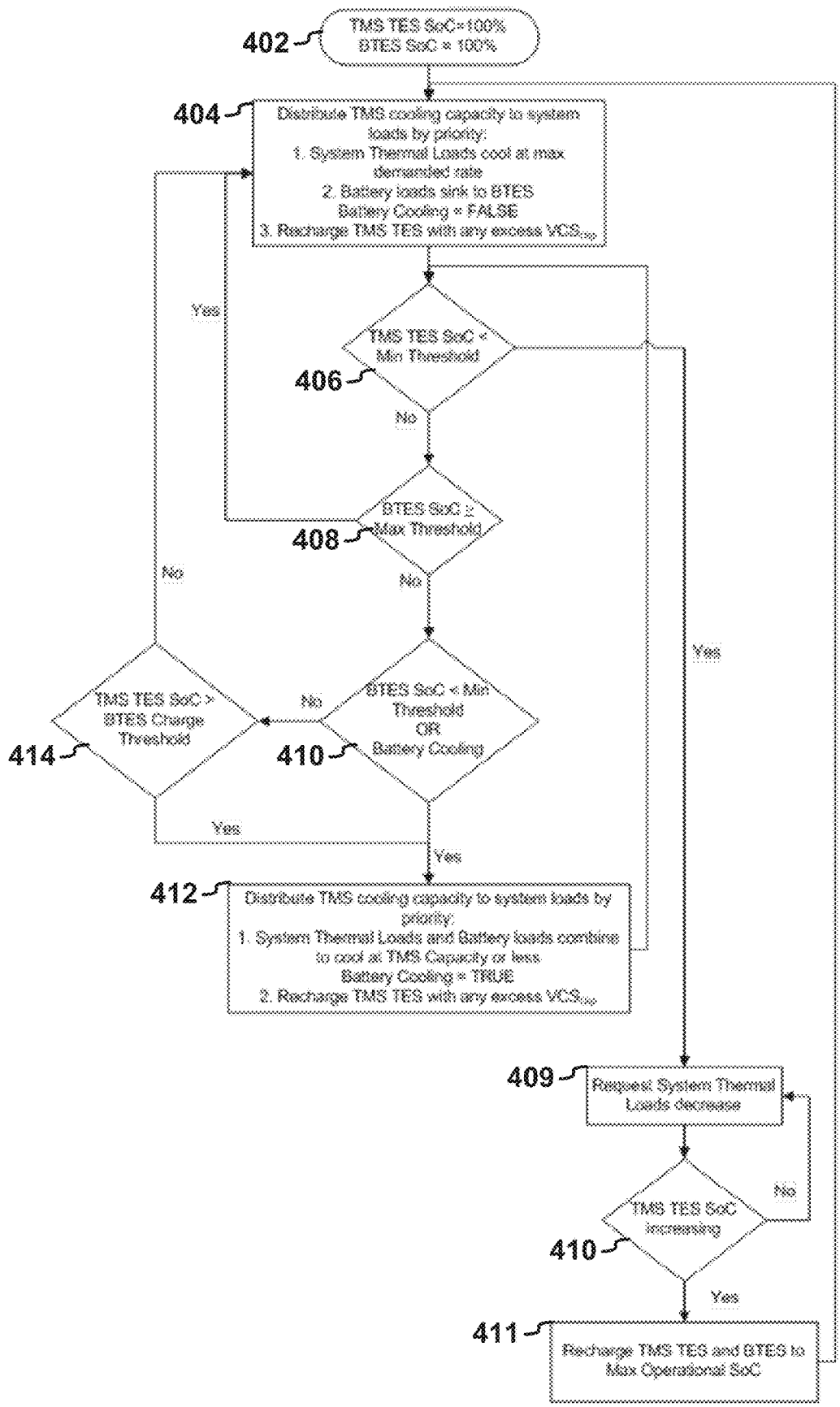
FIG. 4 illustrates an example of a flow diagram for cooling an unknown thermal load.

FIG. 4 illustrates an example of a flow diagram for cooling an unknown thermal load. In the example illustrated in FIG. 4, the electrical source 114 may include, as a non-limiting example, the battery and the battery thermal energy storage (BTES) described above. In addition, the cooling reservoir 112 may include, as a non-limiting example, the thermal management system thermal energy storage (TMS TES) described above.

When the flow logic illustrated in FIG. 4 starts, the state of charge of the TMS TES and the state of charge of the BTES may initially be fully charged (402). In other examples, the state of charge of the TMS TES may be greater than the predetermined completion threshold for the TMS TES. Alternatively or in addition, the state of charge of the BTES may be greater than the predetermined completion threshold for the BTES.

The controller 116 may cause the thermal management components 106 to distribute the cooling capacity of the thermal management system 104 by priority (404). For example, the controller 116 may delay cooling the electrical source 114 and the controller 116 may cause the thermal management components 106 to cool the system thermal load 108, or any portion thereof. In some examples, the controller 116 may cause the thermal management components 106 to provide cooling from the TMS TES as the system thermal load fluctuates. For example, as the dynamic thermal load 118 increases, the controller 116 may direct the cooling fluid 117 to flow from the TMS TES to the electrical apparatus 102, or any portion thereof, that contributed to the dynamic thermal load 118.

The controller 116 may monitor the TMS TES to determine whether the state of charge of the TMS TES is less than the predetermined charge threshold of the TMS TES. For example, the system may determine that the state of charge of the TMS TES drops below the predetermined charge threshold (406, yes). The state of charge of the TMS TES dropping below the predetermined charge threshold may indicate that the dynamic thermal load 118 has increased beyond the thermal capacity of the thermal management system 104. The controller 116 may request that the system thermal loads decrease (409). The controller 116 may monitor the state of charge of the TMS TES to determine whether the state of charge of the TMS TES is increasing (410). While the state of charge of the TES is not increasing (410, no), the controller 116 may continue to request for a decrease in the system thermal load 108. Alternatively or in addition, the controller 116 may wait until the state of charge of the TES is increasing and/or increases to a threshold value.

When the controller 116 determines that the state of charge of the TES is increasing (410, yes), the controller 116 may cause the thermal management components 106 to recharge the TMS TES and the BTES of the electrical source 114 114 (411). For example, the controller 116 may cause the BTES to recharge to the predetermined completion threshold value. In addition, the controller 116 may cause the TMS TES to recharge to the predetermined completion threshold value. When the BTES and the TES are recharged, the controller 116 may shut down the vapor cycle system. Alternatively or in addition, the controller 116 may cause the cooling output of the vapor cycle system to reduce.

When the controller 116 determines that the state of charge of the TMS TES is not less than the predetermined charge threshold (406, no), the controller 116 may continue to delay cooling the battery. For example, the controller 116 may determine whether the state of charge of the BTES is within a range between the predetermined upper charge threshold and the predetermined lower charge threshold. When the state of charge of the BTES of the electrical source 114 is greater than or equal to the predetermined upper charge threshold (408, yes), the controller 116 may continue to delay cooling the electrical source 114. When the state of charge of the BTES of the electrical source 114 is less than the predetermined upper charge threshold (408, no) and less than the predetermined lower charge threshold (410, yes), the controller 116 may cool the system thermal load 108 and the electrical source 114 (412).

When the state of charge of the BTES of the electrical source 114 is within the range between the predetermined upper charge threshold and the predetermined lower charge threshold, the controller 116 may determine whether to continue to delay cooling the BTES based on the state of charge of the TMS TES. For example, the controller 116 may determine whether the state of charge of the TMS TES is greater than the predetermined reserve threshold of the TMS TES (414). When the state of charge of the TES is greater than the predetermined reserve threshold of the TMS TES (414, yes), the controller 116 may cause the BTES of the electrical source 114 to be cooled (412). When the state of charge of the TES is not greater than the predetermined reserve threshold of the TMS TES (414, no), the controller 116 may continue to delay cooling the BTES of the electrical source 114.

The logic illustrated in the flow diagrams in FIG. 3 and FIG. 4 may include additional, different, or fewer operations than illustrated. The operations illustrated may be performed in an order different than illustrated. For example, the logic illustrated in the flow diagrams in FIG. 3 and FIG. 4 may include cooling an electrical apparatus and an electrical source with a cooling source, the electrical source configured to supply electricity to the electrical apparatus.

Figure 5:
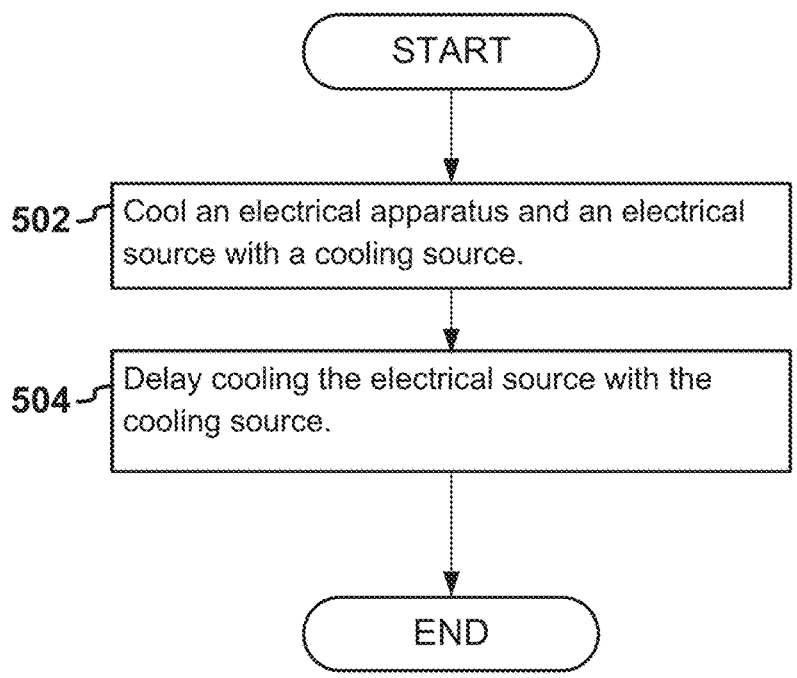
FIG. 5 illustrates an example of a flow diagram for cooling a thermal load.

FIG. 5 illustrates an example of a flow diagram for cooling a thermal load. When the flow logic illustrated in FIG. 5 starts, the controller may cause the electrical apparatus 102 and the electrical source 114 to be cooled by the cooling source 110 (502). In some examples, the controller 116 may further cause the electrical apparatus 102 to be cooled with the first cooling fluid 206. The first cooling fluid 206 may be cooled by the cooling source 110. In addition, the controller 116 may cause the electrical source to be cooled with the second cooling fluid 208. The second cooling fluid 208 may be cooled by the cooling source 110.

The controller 116 may suspend cooling of the electrical source 114 with the cooling source 110 in response to the state of charge 122 of the electrical source 114 being greater than the predetermined charge threshold of the electrical source 114 (504). In some examples, the controller 116 may delay cooling of the electrical source 114. For example, the controller 116 may delay cooling the electrical source 114 in response to detection of the dynamic thermal load 118, wherein the dynamic thermal load 118 may be at least partially created by the electrical apparatus 102 and may varies in response to an increased amount of power provided to the electrical apparatus 102 by the electrical source 114. Alternatively or in addition, the controller 116 may delay cooling the electrical source 114 is in response to a determination that the dynamic thermal load 118 created by the electrical apparatus 102 is greater than a thermal capacity of the cooling source 110.

The logic illustrated in the flow diagrams in FIG. 3 and FIG. 4 may include additional, different, or fewer operations than illustrated. The operations illustrated may be performed in an order different than illustrated. For example the logic may include logic to cool the electrical source 114 in response to the state of charge 122 of the electrical source 114 being within the predetermined charge range and in response to the state of charge 124 of the cooling reservoir 112 configured to cool the electrical apparatus 102 being greater than the predetermined reserve threshold of the cooling reservoir 112.

Alternatively or in addition, the logic may include logic to suspend operation of the cooling source 110. For example, the logic may suspend operation of the cooling source 110 in response to detection of the state of charge 122 of the electrical source 114 being greater than or equal to a predetermined completion threshold of the electrical source 110. Alternatively or in addition, the logic may suspend operation of the cooling source 110 in response to detection of the state of charge 124 of the cooling reservoir 112 being greater than or equal to a predetermined completion threshold of the cooling reservoir 112.

In addition, the logic described in the flow diagrams may be implemented with and/or performed on any example of thermal management components described herein. For example, the vapor cycle system described in FIG. 3 and FIG. 4 above is merely used for illustrative purposes and is not intended to limit the type of the cooling source 110 that may be used to implement and/or perform the logic described in the flow diagrams.

Figure 6:
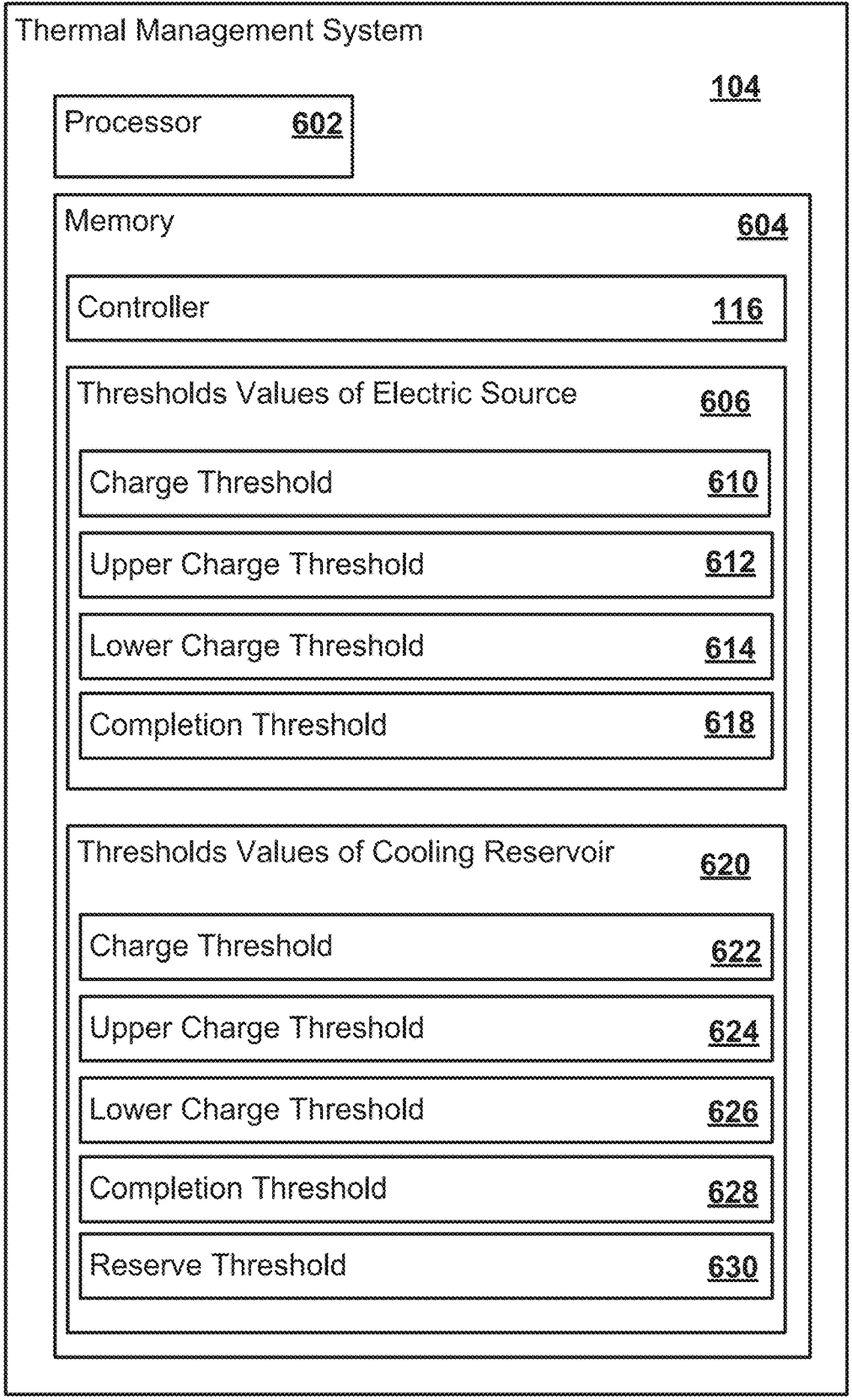
FIG. 6 illustrates an example of a thermal management system that includes a memory and a processor.

In general, the thermal management system 104 may include additional, different, or fewer components. The thermal management system 104 may be implemented with additional, different, or fewer components than illustrated. For example, FIG. 6 illustrates an example of the thermal management system 104 that includes a memory 604 and a processor 602.

The processor 602 may further include one or more devices operable to execute logic of the thermal management system 104. The logic of the thermal management system 104 may include computer executable instructions or computer code embodied in the memory 604 or in other memory that when executed by the processor 602, cause the processor 602 to perform the features implemented by the logic of the thermal management system 104. The computer code may include instructions executable with the processor 602. In some examples, the memory 604 may include the controller 116. Alternatively or in addition, the memory 604 may include any of the predetermined threshold values described herein. For example, the memory 604 may include one or more predetermined threshold values 606 of the electrical source 114. The one or more predetermined threshold values 606 of the electrical source 114 may include a predetermined charge threshold 610 of the electrical source 114, a predetermined upper charge threshold 612 of the electrical source 114, a predetermined lower charge threshold 614 of the electrical source 114, and/or a completion threshold 618 of the electrical source 114. Alternatively or in addition, the memory 604 may include one or more predetermined threshold values 620 of the cooling reservoir 112. The one or more predetermined threshold values 620 of the cooling reservoir 112 may include a predetermined charge threshold 622 of the cooling reservoir 112, a predetermined upper charge threshold 624 of the cooling reservoir 112, a predetermined lower charge threshold 626 of the cooling reservoir 112, a predetermined completion threshold 628 of the cooling reservoir 112, and/or a predetermined reserve threshold 630 of the cooling reservoir 112.

The thermal management system 104 may be implemented in many different ways. For example, the controller 116 may be hardware or a combination of hardware and software. For example, the controller 116 may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, the controller 116 may include memory hardware, such as a portion of the memory 604, for example, that comprises instructions executable with the processor 602 or other processor to implement one or more of the features of the controller 116. When controller 116 includes the portion of the memory that comprises instructions executable with the processor, the controller 116 may or may not include the processor. In some examples, the controller 116 may just be the portion of the memory 604 or other physical memory that comprises instructions executable with the processor 602 or other processor to implement the features of the controller 116 without the controller 116 including any other hardware. Because the controller 116 includes at least some hardware even when the included hardware comprises software, the controller 116 may be interchangeably referred to as a hardware controller.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the thermal management system 104 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A thermal management system comprising:
   thermal management components including an electrical source configured to supply electricity to an electrical apparatus, the electrical source further configured to store thermal energy, the thermal management components further including a cooling source; and
   a controller configured to:
     cause the electrical apparatus to be cooled with the cooling source, and
     delay cooling the electrical source with the cooling source in response to a state of charge of the electrical source being greater than a predetermined charge threshold of the electrical source, the state of charge of the electrical source comprising a measure of cooling capacity available in the electrical source.

2. The thermal management system of aspect 1, wherein the cooling source comprises a vapor cycle system and the electrical source comprises a battery.

3. The thermal management system of any of aspects 1 to 2, wherein the electrical apparatus comprises a directed energy weapon.

4. The thermal management system of any of aspects 1 to 3, wherein to delay cooling the electrical source, the controller is configured to delay cooling the electrical source in response to detection of a dynamic thermal load, wherein the dynamic thermal load is at least partially created by the electrical apparatus and the dynamic thermal load varies in response to an increased amount of power provided to the electrical apparatus by the electrical source.

5. The thermal management system of any of aspects 1 to 4, wherein the predetermined charge threshold of the electrical source is a predetermined upper charge threshold of the electrical source and the controller is further configured to cause the electrical source to be cooled in response to the state of charge of the electrical source being less than a predetermined lower charge threshold of the electrical source.

6. The thermal management system of any of aspects 1 to 5, further comprising a cooling reservoir configured to store a cooling fluid cooled by the cooling source, wherein the controller is further configured to
delay cooling of the electrical source in response to the state of charge of the electrical source being within a range defined by the predetermined upper charge threshold of the electrical source and the predetermined lower charge threshold of the electrical source and in response to a state of charge of the cooling reservoir being less than a predetermined reserve threshold of the cooling reservoir, wherein the predetermined reserve threshold relates to cooling capacity of the cooling reservoir to provide to the electrical source.

7. The thermal management system of any of aspects 1 to 6, further comprising a cooling reservoir configured to store a cooling fluid cooled by the cooling source, wherein the controller is further configured to
cool of the electrical source in response to the state of charge of the electrical source being within a range defined by the predetermined upper charge threshold and the predetermined lower charge threshold and in response to a state of charge of the cooling reservoir being greater than a predetermined reserve threshold, wherein the predetermined reserve threshold relates to cooling capacity of the cooling reservoir to provide to the electrical source.

8. A method for managing a thermal load, comprising:
   cooling an electrical apparatus and an electrical source with a cooling source, the electrical source configured to supply electricity to the electrical apparatus; and
   suspending cooling of the electrical source with the cooling source in response to a state of charge of the electrical source being greater than a predetermined charge threshold of the electrical source, the state of charge of the electrical source comprising a measure of cooling capacity available in the electrical source.

9. The method of aspect 8, wherein delaying cooling of the electrical source is in response to detection of a dynamic thermal load, wherein the dynamic thermal load is at least partially created by the electrical apparatus and varies in response to an increased amount of power provided to the electrical apparatus by the electrical source.

10. The method of any of aspects 8 to 9, wherein delaying cooling of the electrical source is in response to a determination that a dynamic thermal load created by the electrical apparatus is greater than a thermal capacity of the cooling source.

11. The method of any of aspects 8 to 10, further comprising:
    suspending operation of the cooling source in response to detection of the state of charge of the electrical source being greater than or equal to a predetermined upper threshold of the electrical source.

12. The method of any of aspects 8 to 11, wherein cooling the electrical apparatus and the electrical source further comprises cooling the electrical apparatus with a first cooling fluid cooled by the cooling source and cooling the electrical source with a second cooling fluid cooled by the cooling source.

13. The method of any of aspects 8 to 12, wherein delaying cooling the electrical source further comprises delaying application of the second cooling fluid to the electrical source.

14. The method of any of aspects 8 to 13, further comprising cooling the electrical source in response to the state of charge of the electrical source being within a predetermined charge range and in response to the state of charge of a cooling reservoir being greater than a predetermined reserve threshold of the cooling reservoir, wherein the cooling reservoir configured to cool the electrical apparatus.

15. A system comprising thermal management components, the thermal management components including:

an electrical source configured to store thermal energy and supply electricity to an electrical apparatus;
a cooling source; and
a processor configured to:
cause the electrical apparatus to be cooled with the cooling source, and
suspend cooling of the electrical source with the cooling source in response to a state of charge of the electrical source being greater than a predetermined charge threshold of the electrical source, the state of charge of the electrical source comprising a measure of cooling capacity available from the electrical source.

16. The system of aspect 15, wherein the processor is further configured to determine the state of charge of the electrical source based at least one of a temperature of the electrical source, an ambient temperature of the electrical source, a rate of electrical charge of the electrical source, or a rate of electrical discharge of the electrical source.

17. The system of any of aspects 15 to 16, wherein the electrical apparatus comprises a light emitting diode of a directed energy weapon.

18. The system of any of aspects 15 to 17, wherein to suspend cooling the electrical source, the processor is further configured to delay cooling the electrical source in response to detection that a thermal load created by the electrical apparatus is greater than a thermal capacity of the cooling source.

19. The system of any of aspects 15 to 18, wherein the thermal management components are configured to apply a first cooling fluid to the electrical apparatus to cool the electrical apparatus and the thermal management components are further configured to apply a second cooling fluid to the electrical source to cool the electrical source.

20. The system of any of aspects 15 to 19, further comprising a cooling reservoir configured to store a cooling fluid cooled by the cooling source, wherein the processor is further configured to cause the cooling source to suspend operation in response to the state of charge of the electrical source being greater than a predetermined upper threshold of the electrical source and a state of charge of the cooling reservoir being greater than a predetermined upper threshold of the cooling reservoir.

What is claimed is:

1. A thermal management system comprising:
thermal management components including an electrical source configured to supply electricity to an electrical apparatus, the electrical source further configured to store thermal energy, the thermal management components further including a cooling source; and
a controller configured to:
cause the electrical apparatus to be cooled with the cooling source, and
delay cooling the electrical source with the cooling source in response to detection of a dynamic thermal load and a state of charge of the electrical source being greater than a predetermined charge threshold of the electrical source, the state of charge of the electrical source comprising a measure of cooling capacity available in the electrical source, wherein the dynamic thermal load is at least partially created by the electrical apparatus and the dynamic thermal load varies in response to an increased amount of power provided to the electrical apparatus by the electrical source.

2. The thermal management system of claim 1, wherein the cooling source comprises a vapor cycle system and the electrical source comprises a battery.

3. The thermal management system of claim 1, wherein the electrical apparatus comprises a directed energy weapon.

4. The thermal management system of claim 1, wherein the delay in cooling of the electrical source is in response to a determination that a dynamic thermal load created by the electrical apparatus is greater than a thermal capacity of the cooling source.

5. The thermal management system of claim 1, wherein the controller is further configured to cause the electrical apparatus to be cooled with a first cooling fluid cooled by the cooling source and to cause the electrical source to be cooled with a second cooling fluid cooled by the cooling source.

6. The thermal management system of claim 5, wherein to delaying cooling the electrical source, the controller is further configured to delay application of the second cooling fluid to the electrical source.

7. A thermal management system comprising:
thermal management components including an electrical source configured to supply electricity to an electrical apparatus, the electrical source further configured to store thermal energy, the thermal management components further including a cooling source; and
a controller configured to:
cause the electrical apparatus to be cooled with the cooling source,
delay cooling the electrical source with the cooling source in response to a state of charge of the electrical source being greater than a predetermined upper charge threshold of the electrical source, the state of charge of the electrical source comprising a measure of cooling capacity available in the electrical source, and
cause the electrical source to be cooled in response to the state of charge of the electrical source being less than a predetermined lower charge threshold of the electrical source.

8. The thermal management system of claim 7, further comprising a cooling reservoir configured to store a cooling fluid cooled by the cooling source, wherein the controller is further configured to
delay cooling of the electrical source in response to the state of charge of the electrical source being within a range defined by the predetermined upper charge threshold of the electrical source and the predetermined lower charge threshold of the electrical source and in response to a state of charge of the cooling reservoir being less than a predetermined reserve threshold of the cooling reservoir, wherein the predetermined reserve threshold relates to cooling capacity of the cooling reservoir to provide to the electrical source.

9. The thermal management system of claim 7, further comprising a cooling reservoir configured to store a cooling fluid cooled by the cooling source, wherein the controller is further configured to:
cool the electrical source in response to the state of charge of the electrical source being within a range defined by the predetermined upper charge threshold and the predetermined lower charge threshold and in response to a state of charge of the cooling reservoir being greater than a predetermined reserve threshold, wherein the predetermined reserve threshold relates to cooling capacity of the cooling reservoir to provide to the electrical source.

10. A system comprising thermal management components, the thermal management components including:
an electrical source configured to store thermal energy and supply electricity to an electrical apparatus;
a cooling source; and a processor configured to:
  cause the electrical apparatus to be cooled with the cooling source, and
  suspend cooling of the electrical source with the cooling source in response to a state of charge of the electrical source being greater than a predetermined charge threshold of the electrical source and a thermal load created by the electrical apparatus being greater than a thermal capacity of the cooling source, the state of charge of the electrical source comprising a measure of cooling capacity available from the electrical source.

11. The system of claim 10, wherein the processor is further configured to determine the state of charge of the electrical source based at least one of a temperature of the electrical source, an ambient temperature of the electrical source, a rate of electrical charge of the electrical source, or a rate of electrical discharge of the electrical source.

12. The system of claim 10, wherein the electrical apparatus comprises a light emitting diode of a directed energy weapon.

13. The system of claim 10, wherein the thermal management components are configured to apply a first cooling fluid to the electrical apparatus to cool the electrical apparatus and the thermal management components are further configured to apply a second cooling fluid to the electrical source to cool the electrical source.

14. The system of claim 10, further comprising a cooling reservoir configured to store a cooling fluid cooled by the cooling source, wherein the processor is further configured to cause the cooling source to suspend operation in response to the state of charge of the electrical source being greater than a predetermined upper threshold of the electrical source and a state of charge of the cooling reservoir being greater than a predetermined upper threshold of the cooling reservoir.

15. The system of claim 10, wherein the processor is further configured to suspend cooling of the electrical source is in response to detection of a dynamic thermal load, wherein the dynamic thermal load is at least partially created by the electrical apparatus and varies in response to an increased amount of power provided to the electrical apparatus by the electrical source.

16. A thermal management system comprising:
  thermal management components including an electrical source configured to supply electricity to an electrical apparatus, the electrical source further configured to store thermal energy, the thermal management components further including a cooling source; and
  a controller configured to:
  cause the electrical apparatus to be cooled with the cooling source, and
  delay cooling the electrical source with the cooling source in response to a state of charge of the electrical source being greater than a predetermined charge threshold of the electrical source, the state of charge of the electrical source comprising a measure of cooling capacity available in the electrical source, wherein to delay cooling the electrical source, the controller is further configured to suspend operation of the cooling source in response to detection of the state of charge of the electrical source being greater than or equal to a predetermined upper threshold of the electrical source.

* * * * *